(12) United States Patent
Inoue

(10) Patent No.: US 9,176,704 B2
(45) Date of Patent: Nov. 3, 2015

(54) GENERATING AUGMENTED REALITY IMAGE USING MOBILE TERMINAL DEVICE

(71) Applicant: BANDAI CO., LTD., Tokyo (JP)

(72) Inventor: Mitsutaka Inoue, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 170 days.

(21) Appl. No.: 13/938,461

(22) Filed: Jul. 10, 2013

(65) Prior Publication Data

US 2014/0022282 A1    Jan. 23, 2014

(30) Foreign Application Priority Data

Jul. 18, 2012 (JP) .................................. 2012-160019

(51) Int. Cl.
*G09G 5/00* (2006.01)
*G06F 3/147* (2006.01)
*G06F 17/30* (2006.01)
*G09G 5/377* (2006.01)

(52) U.S. Cl.
CPC .......... *G06F 3/147* (2013.01); *G06F 17/30047* (2013.01); *G06T 2207/20221* (2013.01); *G09G 5/377* (2013.01); *G09G 2340/0407* (2013.01); *G09G 2340/12* (2013.01)

(58) Field of Classification Search
CPC ............... G09G 5/377; G09G 2340/12; G06F 17/30047; G06T 2207/20212; G06T 2207/20221
See application file for complete search history.

(56) References Cited

U.S. PATENT DOCUMENTS

| | | | |
|---|---|---|---|
| 2004/0080530 A1* | 4/2004 | Lee ................................. | 345/738 |
| 2005/0088698 A1* | 4/2005 | Matama .......................... | 358/2.1 |
| 2005/0219384 A1* | 10/2005 | Herberger et al. ............. | 348/239 |
| 2006/0251338 A1* | 11/2006 | Gokturk et al. ................ | 382/305 |
| 2007/0057971 A1* | 3/2007 | Bychkov et al. ............... | 345/629 |
| 2009/0061901 A1* | 3/2009 | Arrasvuori et al. ......... | 455/456.3 |
| 2011/0052083 A1* | 3/2011 | Rekimoto ...................... | 382/218 |
| 2011/0096174 A1* | 4/2011 | King et al. .................. | 348/207.1 |

FOREIGN PATENT DOCUMENTS

| | | | |
|---|---|---|---|
| JP | 2009280946 A | * | 12/2009 |
| JP | 2011130386 A | * | 6/2011 |
| JP | 2011-204047 A | | 10/2011 |

\* cited by examiner

*Primary Examiner* — Michelle L Sams
(74) *Attorney, Agent, or Firm* — Rabin and Berdo, P.C.

(57) ABSTRACT

A controller performs image recognition of the design of at least part of a picture obtained by capturing, by an image capturing unit, an image of a character(s) printed on or attached to a character item, generates an augmented reality image by combining a stagecraft image, prepared in association with each of image-recognized designs, with a subject image of a person wearing or having the character item, and displays the augmented reality image on a display unit.

7 Claims, 4 Drawing Sheets

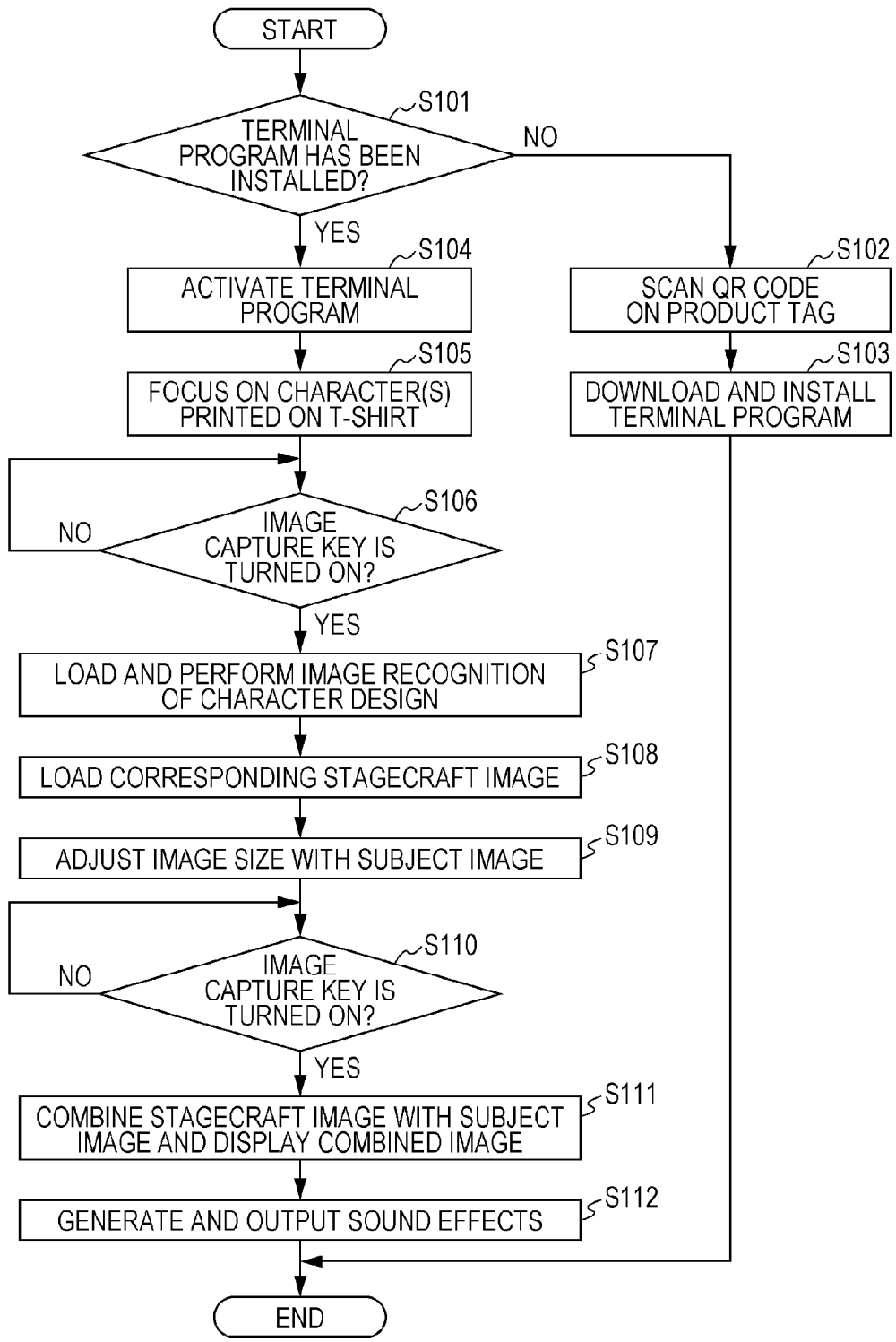

GENERATING AUGMENTED REALITY IMAGE USING MOBILE TERMINAL DEVICE

CROSS REFERENCES TO RELATED APPLICATIONS

The present invention contains subject matter related to Japanese Patent Application No. 2012-160019 filed in the Japan Patent Office on Jul. 18, 2012, the entire contents of which are incorporated herein by reference.

BACKGROUND OF THE INVENTION

1. Field of the Invention

The present invention relates to a mobile terminal device, a terminal program, an augmented reality system, and a character item such as clothing.

2. Description of the Related Art

Printed T-shirts are T-shirts on which images of figures or motifs are printed as still images by using a processing technique such as silk screen. In recent years, the market is flooded with T-shirts, bags, or character items (may also be referred to as "character goods") such as toys on which popular characters or popular animation for children are printed, and these items receive a good reception from children.

At the same time, because of the ever-increasing multi-functionality of mobile terminal devices, recently smartphones in the enhanced network communication environment for connecting to the Internet have been widely used in place of mobile phones. With a smartphone, the user can obtain application programs distributed in the market by downloading them. Accordingly, the user can customize his/her smartphone over a wide variety of genres as a tool for utility uses such as data management and text messaging, for practical uses such as weather forecast, public transportation transfer guide, gourmet guide, and navigation using satellites, for business uses such as a memo tool and business card management, for communication uses such as "Skype" (registered trademark) and "Twitter" (registered trademark), or for entertainment uses such as online games.

Hitherto, augmented reality (AR) technology that augments a real environment perceived by human beings by using a computer is known. For example, Japanese Unexamined Patent Application Publication No. 2011-204047 introduces technology for appropriately changing an object image combined with an image representing the appearance of a real world in an augmented reality image.

As disclosed in Japanese Unexamined Patent Application Publication No. 2011-204047, AR technology arranges figures with certain shapes, which are called markers and which are used to recognize three-dimensional positions, in a real world, and an image capturing device captures an image of the real world including these markers. Therefore, the markers are arranged in a configuration where they are subjected to perspective transformation in the captured image. Perspective transformation technology is applied to objects associated with the markers, and object images obtained with the captured image as the background are combined, thereby generating an augmented reality image. This AR technology makes it possible to reproduce computer graphics (CG) including moving images or still images.

If a collaboration of the above-described smartphones and character items such as T-shirts enables reproduction of an augmented reality image generated by combining a consumer with a stagecraft image associated with the design of a character item purchased by the consumer, that character item can gain added value. It is thus expected that more elaboration and promotion effects can be achieved. In realization of this collaboration and its effects, there is also a demand for easily reproducing an augmented reality image without using sophisticated perspective transformation technology.

SUMMARY OF THE INVENTION

Accordingly, it is an object of the present invention to provide a mobile terminal device, a terminal program, an augmented reality system, and a character item that can achieve more elaboration and the effects of promoting the character item by configuring a mechanism that easily reproduces an augmented reality image associated with the design of the character item purchased by a consumer.

According to an aspect of the present invention, there is provided a mobile terminal device including an image capturing unit; a display unit; and a controller. The controller performs image recognition of design of at least part of a picture obtained by capturing, by the image capturing unit, an image of a character printed on or attached to clothing, generates an augmented reality image by combining a stagecraft image, prepared in association with each of image-recognized designs, with a subject image of a person wearing the clothing, and displays the augmented reality image on the display unit.

The controller preferably changes the image size of the stagecraft image in accordance with the image size of the subject image.

The mobile terminal device preferably further includes an audio output unit. When the stagecraft image is displayed on the display unit, the controller preferably generates sound effects and outputs the generated sound effects to the audio output unit.

According to another aspect of the present invention, there is provided a terminal program in an augmented reality system including clothing on which a particular character is printed or attached and a mobile terminal device that at least includes an image capturing unit and a display unit, generates an augmented reality image from design of at least part of a picture captured by the image capturing unit, and displays the augmented reality image on the display unit. The terminal program is controlled by a computer used in the mobile terminal device. The terminal program causes the computer to execute a process including: performing image recognition of design of at least part of a picture obtained by capturing, by the image capturing unit, an image of the character; and generating an augmented reality image by combining a stagecraft image, prepared in association with each of image-recognized designs, with a subject image of a person wearing the clothing, and displaying the augmented reality image on the display unit.

According to another aspect of the present invention, there is provided an augmented reality system including clothing on which a particular character is printed or attached; and a mobile terminal device. The mobile terminal device at least includes an image capturing unit and a display unit, and includes a controller. The controller performs image recognition of design of at least part of a picture obtained by capturing, by the image capturing unit, an image of the character, generates an augmented reality image by combining a stagecraft image, prepared in association with each of image-recognized designs, with a subject image of a person wearing the clothing, and displays the augmented reality image on the display unit.

According to another aspect of the present invention, there is provided clothing including a particular character printed thereon or attached thereto. The clothing is used in an augmented reality system including a mobile terminal device. The mobile terminal device performs image recognition of design of at least part of a picture obtained by capturing an image of the character, generates an augmented reality image by combining a stagecraft image, prepared in association with each of image-recognized designs, with a subject image of a person wearing the clothing, and displays the augmented reality image.

According to another aspect of the present invention, there is provided clothing including a particular character printed thereon or attached thereto. At least part of the printed or attached character includes design whose image is recognized from an image of the character included in a subject image of a person wearing the clothing, the subject image being captured by a mobile terminal device. For the design, a corresponding image is prepared in the mobile terminal device, and the stagecraft image is used in generation of an augmented reality image by the mobile terminal device by being combined with the subject image of the person wearing the clothing.

According to the present invention, it is possible to provide a mobile terminal device, a terminal program, an augmented reality system, and a character item that can achieve more elaboration and the effects of promoting the character item by configuring a mechanism that easily reproduces an augmented reality image associated with the design of the character item such as clothing purchased by a consumer.

BRIEF DESCRIPTION OF THE DRAWINGS

FIG. 3 is a flowchart showing the operation of the mobile terminal device according to the embodiment of the present invention.

DESCRIPTION OF THE PREFERRED EMBODIMENTS

Configuration of Embodiment

Hereinafter, an embodiment of the present invention (hereinafter may simply be referred to as the embodiment) will be described in detail with reference to the attached drawings.

Figure 1:
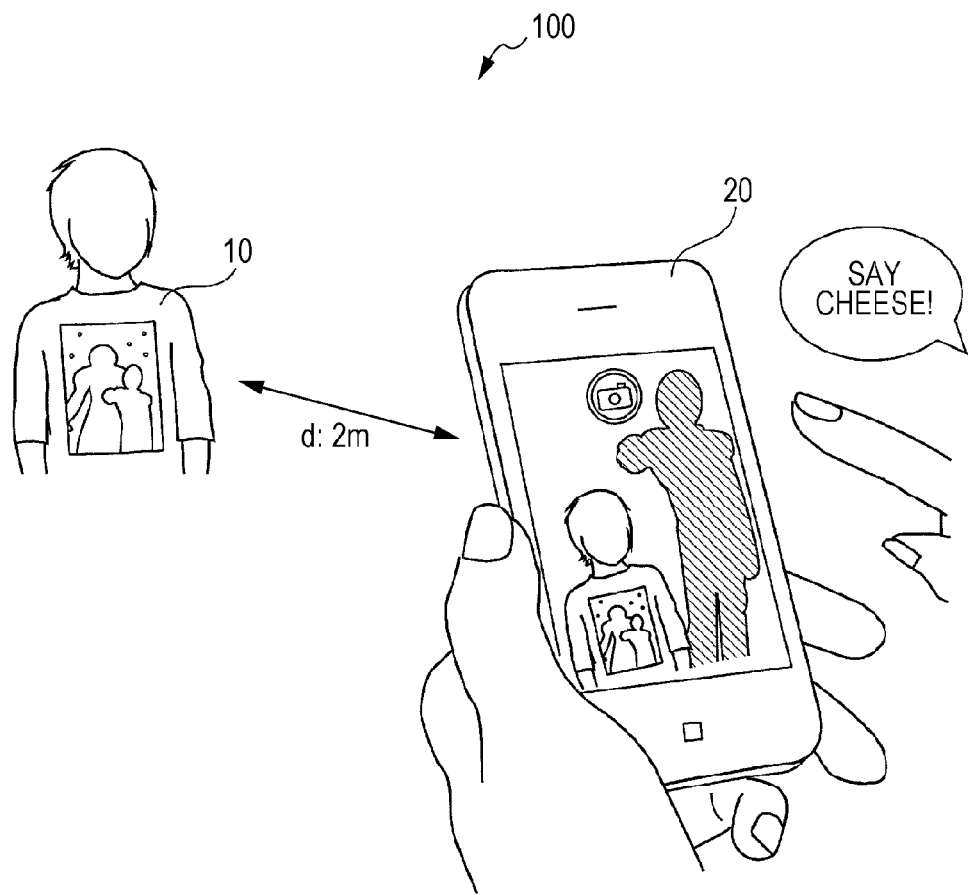
FIG. 1 is an image diagram of an augmented reality system according to an embodiment of the present invention.

FIG. 1 shows an augmented reality system 100 according to the embodiment. As shown in FIG. 1, the augmented reality system 100 according to the embodiment includes a character item 10 on which a particular character(s) is(are) printed or attached, and a mobile terminal device 20, such as a smartphone, which performs image recognition of the design of at least part of a picture obtained by capturing an image of the character(s) printed on the character item 10, generates an augmented reality image by combining a stagecraft image, which is prepared in association with each of image-recognized designs, with a subject image of a person wearing or having the character item 10, and displays the augmented reality image on a screen.

Here, the character item 10 is, for example, a children's T-shirt on which characters such as heroes like the Power Rangers (registered trademark) or the like are printed. A consumer who has purchased this T-shirt (in many cases, the parent of a child wearing this T-shirt) uses the mobile terminal device 20 to scan a Quick Response (QR) code (registered trademark) attached to the tag of the character item 10, thereby downloading and obtaining, for free, an application program (a terminal program 260 described later) that reproduces an augmented reality image from the site of an entrepreneur or the like who owns the copyright of the characters printed on the T-shirt.

By activating the terminal program 260 obtained by downloading, the consumer focuses on the design on the front body of the child wearing the T-shirt and captures an image to load the design of the characters. Only with this image capturing operation, a two-shot image of the child and a hero making a hero-like pose, who appears next to the child as a stagecraft image though there is only the child in reality, can be captured by using simple AR technology. At this time, the mobile terminal device 20 performs image recognition of the design of at least part of a picture of the character item 10, which is obtained by image capturing, generates an augmented reality image by combining a stagecraft image, which is prepared in advance in association with each of image-recognized designs, with a subject image of the child wearing the T-shirt, and displays the augmented reality image on the screen.

Figure 2:
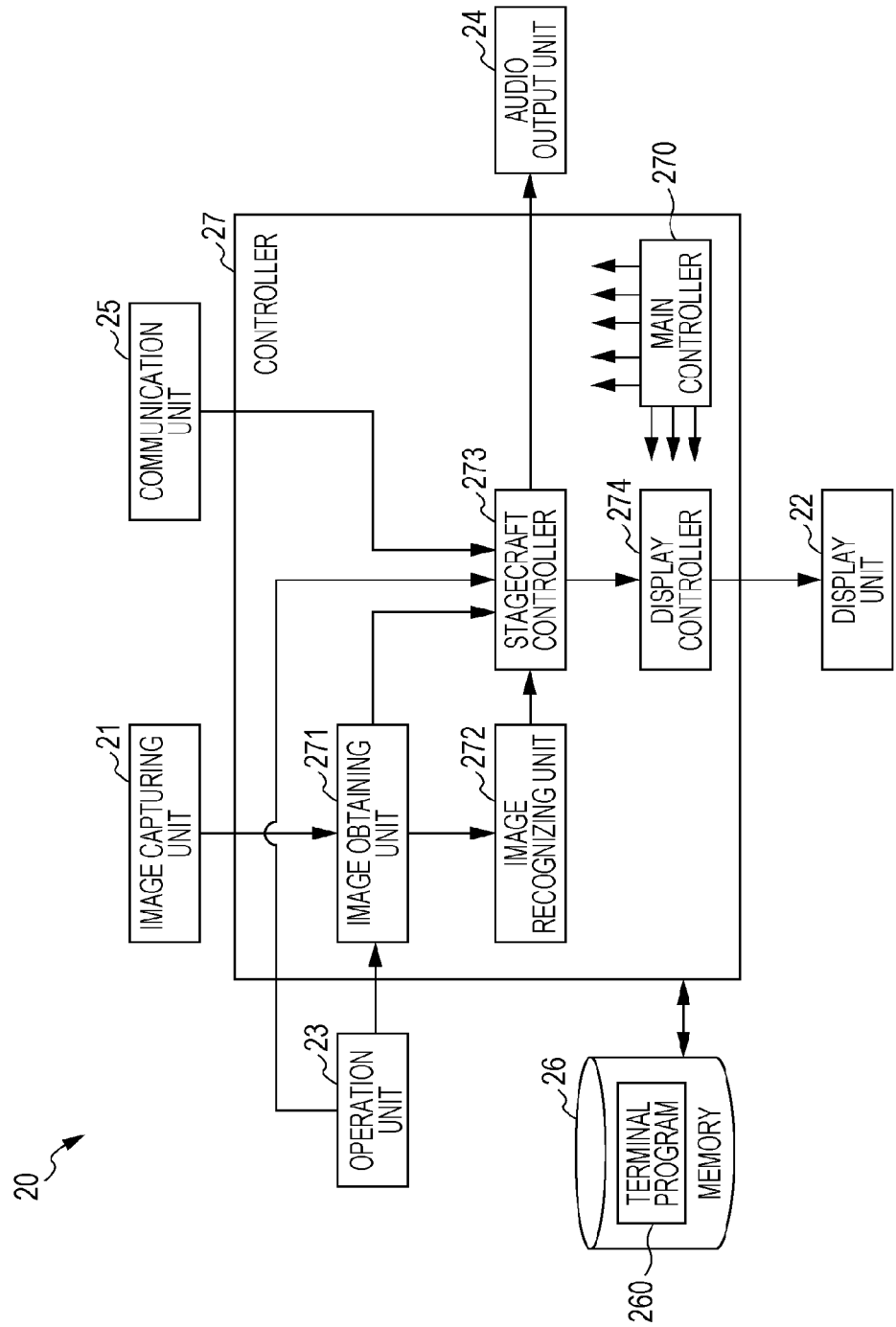
FIG. 2 is a block diagram showing the internal configuration of a mobile terminal device according to the embodiment of the present invention.

FIG. 2 shows the internal configuration of the mobile terminal device 20 according to the embodiment. As shown in FIG. 2, the mobile terminal device 20 includes an image capturing unit 21, a display unit 22, an operation unit 23, an audio output unit 24, a communication unit 25, a memory 26, and a controller 27.

The image capturing unit 21 is a camera including photoelectric transducers such as charge-coupled device (CCD) or complementary metal oxide semiconductor (CMOS) image sensors, and a control circuit thereof. The display unit 22 includes, for example, liquid crystal display (LCD) devices or organic electro-luminescence (EL) devices where many pixels (combination of light-emitting elements of multiple colors) are arranged in a matrix. The display unit 22 displays display information, including an augmented reality image generated by the controller 27 and written in a certain area (video random-access memory (VRAM) area) of the memory 26.

The operation unit 23 includes key switches to which various functions are allocated, such as a power key, a conversation key, numeral keys, character keys, direction keys (left, right, up, and down), a confirm key, a send key, and an image capture key. When these keys are operated by an operator, the operation unit 23 generates signals corresponding to the contents of the operation and outputs the signals as instructions issued by the operator to the controller 27. Alternatively, the operation unit 23 may be realized as a touch panel that inputs position information. In this case, the above-described key switches and an augmented reality image are displayed on the touch panel.

The audio output unit 24 is a loudspeaker that outputs sound including sound effects generated by the controller 27. The communication unit 25 catches a wireless communication system to perform wireless communication with a base station (not shown) connected to a communication network and transmits/receives various types of data to/from the base station. Various types of data include audio data in audio conversation, message data in sending/receiving of messages, and World Wide Web (Web) page data in browsing of Web pages. In relation to the embodiment of the present invention, the communication unit 25 downloads and obtains data necessary for generating an augmented reality image corresponding to the character item 10 from the site (server) of the entrepreneur. At this time, the communication unit 25 connects to the server (not shown) in accordance with, for example, a protocol conforming to the Transmission Control Protocol/Internet Protocol (TCP/IP).

The memory 26 includes a work area and the VRAM area, besides a program area storing the terminal program 260 according to the embodiment. The work area stores an augmented reality image generated by the controller 27 or an augmented reality image obtained via the Internet every time that image is generated or obtained. In the VRAM area, display information including the augmented reality image is rendered. For example, a semiconductor storage element or a magnetic or optical storage element is mounted as the memory 26.

The controller 27 has the function of performing image recognition of the design of at least part of a picture obtained by image capturing performed by the image capturing unit 21, generating an augmented reality image by combining a stagecraft image, which is prepared in association with each of image-recognized designs, with a subject image of a person wearing or having the character item 10, and displaying the augmented reality image on the display unit 22. At this time, the controller 27 may change the image size of the stagecraft image in accordance with the image size of the subject image. Also, when the stagecraft image is displayed on the display unit 22, the controller 27 may generate sound effects and output the generated sound effects to the audio output unit 24.

The structure of the terminal program 260 executed by the controller 27 is exploded and shown in FIG. 2. As shown in FIG. 2, the controller 27 includes a main controller 270, an image obtaining unit 271, an image recognizing unit 272, a stagecraft controller 273, and a display controller 274.

The image obtaining unit 271 loads an image obtained by capturing, by the image capturing unit 21, an image of the design of characters printed on or attached to the character item 10, such as a T-shirt, and outputs the image to the image recognizing unit 272. The image recognizing unit 272 performs image recognition of the design loaded by the image obtaining unit 271 and outputs the image recognition result to the stagecraft controller 273. The stagecraft controller 273 generates an augmented reality image by combining a stagecraft image, which is prepared in association with each of image-recognized designs, with a subject image of a person wearing or having the character item 10, and displays the augmented reality image on the display unit 22.

At this time, the stagecraft controller 273 can change the image size of the stagecraft image in accordance with the image size of the subject image obtained by actually capturing an image. Also, when the stagecraft image is displayed on the display unit 22, the stagecraft controller 273 may generate sound effects and output the generated sound effects to the audio output unit 24.

The display controller 274 renders an augmented reality image generated by the stagecraft controller 273 in the VRAM area of the memory 26, reads the rendered display information in synchronization with display timing, and displays the display information on the display unit 22.

In order for the controller 27 to perform image recognition of the design of at least part of a picture obtained by image capturing performed by the image capturing unit 21, generate an augmented reality image by combining a stagecraft image, which is prepared in association with each of image-recognized designs, with a subject image of a person wearing or having the character item 10, and display the augmented reality image on the display unit 22, the main controller 270 is in charge of sequence control of each of the image obtaining unit 271, the image recognizing unit 272, the stagecraft controller 273, and the display controller 274 described above.

Operation of Embodiment

Hereinafter, the operation of the mobile terminal device 20 according to the embodiment will be described on the basis of the flowchart of FIG. 3, and with reference to the screen configuration shown in FIGS. 1, 4A, and 4B.

Firstly, when power is turned on, the controller 27 (main controller 270) of the mobile terminal device 20 determines whether the terminal program 260 has already been installed in the mobile terminal device 20 (step S101). The main controller 270 can determine whether the terminal program 260 has already been installed by referring to a list of installed applications (not shown) allocated to and stored in a certain area of the memory 26. When it is determined that the terminal program 260 has not been installed yet ("NO" in step S101), the main controller 270 generates and displays, on the display unit 22, a message indicating that the terminal program 260 has not been installed, and prompts the consumer to obtain the terminal program 260. In response to the message, the consumer scans a QR code (registered trademark) attached to an item tag 30, as shown in FIG. 4A (step S102). Accordingly, the terminal program 260 is automatically downloaded to the mobile terminal device 20, and further, when the terminal program 260 is installed, the terminal program 260 is stored in the program area of the memory 26 (step S103).

In contrast, when it is determined in step S101 that the terminal program 260 has already been installed in the mobile terminal device 20 ("YES" in step S101), the consumer executes an operation for activating the terminal program 260. When the terminal program 260 is activated (step S104), it becomes possible to perform image recognition of the design of a character(s) printed on the character item 10 and to generate an augmented reality image based on the image recognition result, as described later.

Figure 4A:
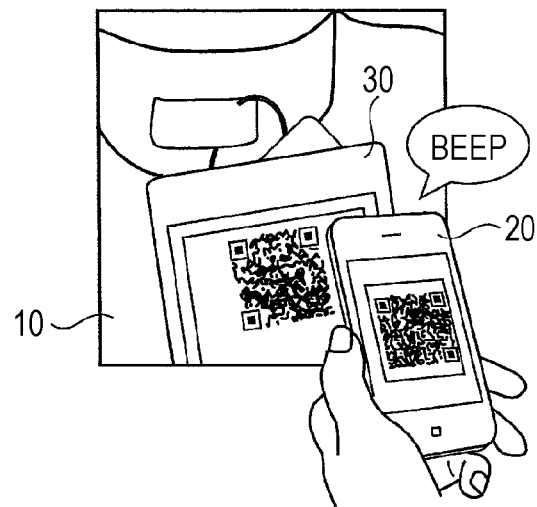
FIGS. 4A and 4B are diagrams representing, on a screen, the operation of the mobile terminal device according to the embodiment of the present invention.
Figure 4B:
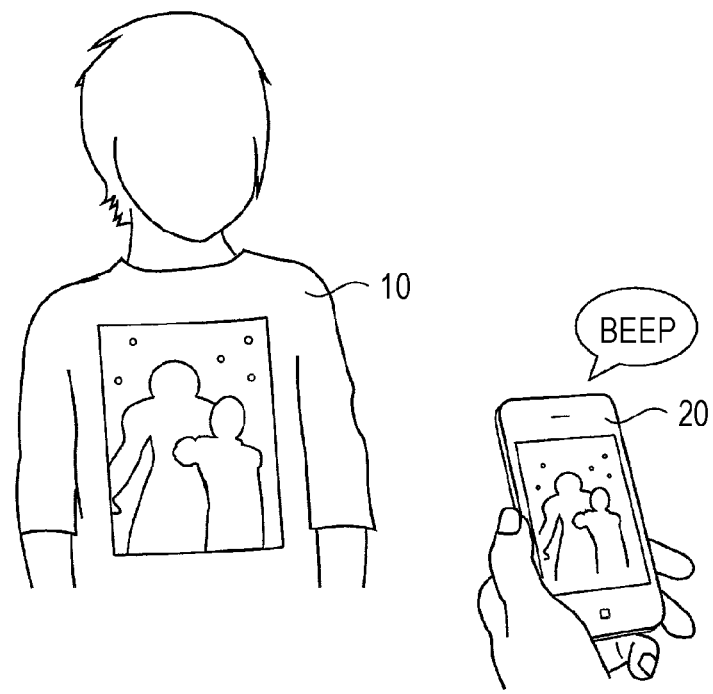

In response to activation of the terminal program 260, the consumer focuses on a character(s) printed on the front body of a T-shirt worn by a child, as shown in FIG. 4B (step S105). When the consumer turns on the image capture key of the operation unit 23 or an image capture button allocated to a partial area of the display unit 22 ("YES" in step S106), the main controller 270 detects this and shifts control to the image obtaining unit 271. The image obtaining unit 271 hands the character design, an image of which has been captured by the image capturing unit 21, over to the image recognizing unit 272, and the image recognizing unit 272 performs image recognition of the character design (step S107).

The image recognition result of the design, obtained by the image recognizing unit 272, is output to the stagecraft controller 273. The stagecraft controller 273 loads a stagecraft image prepared in association with each of image-recognized character designs (step S108). When displaying the loaded stagecraft image on the display unit 22 via the display controller 274, the stagecraft controller 273 executes a process of changing the image size of the stagecraft image in accordance with the image size of a subject image, as indicated by a bidirectional arrow in FIG. 1 (step S109). That is, when the image size of the subject image is great, the stagecraft controller 273 determines that the image capturing distance d between the subject and the mobile terminal device 20 is short, and the stagecraft controller 273 displays the stagecraft image at a relatively large size. Meanwhile, when the image size of the subject image is becoming small, the image size of the stagecraft image is also made relatively small, thereby adjusting the image size of the stagecraft image to the subject image of the child wearing the T-shirt.

That is, when the distance between the child, whose image is the subject image, and the mobile terminal device 20 is too short, the stagecraft image is displayed at a large size, and accordingly the stagecraft image is not fully displayed in the effective display screen area of the display unit 22. Therefore, the consumer adjusts the image capturing distance d when capturing an image (the consumer takes a few steps backward and captures an image), and the stagecraft image becomes within the effective display area of the display unit 22. In this case, because the image size of the child accordingly becomes small, the image size of the stagecraft image is also reduced to adjust the image capturing position where the image sizes of the subject image and the stagecraft image are optimal. In this way, the sense of image sizes of the subject image and the stagecraft image is adjusted on the basis of the image capturing distance d.

The determination of the size of the subject image, which changes in accordance with the image capturing distance d, is performed by making a comparison with reference to the image size in the case where the image capturing distance d is, for example, 2 m, as shown in FIG. 1. That is, the optimal image capturing distance d is about 2 m based on the relationship between the physique of the child, serving as the subject, and the depth of field of a lens generally used as the image capturing unit 21 of the mobile terminal device 20.

Next, when the image capture key is turned on by the consumer and when the main controller 270 detects this ("YES" in step S110), the stagecraft controller 273 generates an augmented reality image by combining the stagecraft image, whose image capturing position has been previously adjusted, and the subject image of the child wearing the T-shirt, and outputs the augmented reality image to the display controller 274. The display controller 274 renders the augmented reality image, generated by the stagecraft controller 273, in the VRAM area of the memory 26, reads the rendered augmented reality image in synchronization with the display timing of the display unit 22, and displays the augmented reality image on the display unit 22 (step S111). That is, although there is only the child in reality, a two-shot image based on the augmented reality image where a hero appears next to the child by using simple AR technology is displayed on the screen of the display unit 22. The displayed image is an image as if a ceremonial photograph of the child wearing the T-shirt and the hero were taken.

At this time, when the stagecraft image is displayed on the display unit 22, the stagecraft controller 273 may generate sound effects and output the generated sound effects to the audio output unit 24. In this case, the audio output unit 24 can create the feeling that the hero has appeared by outputting the sound effects to the outside, and, as a result, the stagecraft effects are enhanced (step S112).

As described above, according to the mobile terminal device 20 according to the embodiment, the controller 27 performs image recognition of the design of a picture obtained by capturing, by the image capturing unit 21, an image of a character(s) printed on or attached to the character item 10, generates an augmented reality image by combining a stagecraft image, which is prepared in association with each of designs, with a subject image of a person wearing or having the character item 10, and displays the augmented reality image on the display unit 22. Therefore, an augmented reality image made from a stagecraft image and a subject image can be easily generated without involving perspective transformation technology. Also, more elaboration and the effects of promoting the character item 10 can be achieved by displaying an augmented reality image associated with the character(s) of the character item 10 purchased by the consumer.

The terminal program 260 according to the embodiment is, for example, as shown in the block diagram of FIG. 2, the terminal program 260 controlled by a computer (the controller 27) used in the mobile terminal device 20 in the augmented reality system 100 including the character item 10 on which a particular character(s) is(are) printed or attached, and the mobile terminal device 20. The mobile terminal device 20 at least includes the image capturing unit 21 and the display unit 22, generates an augmented reality image from the design of at least part of a picture obtained by image capturing performed by the image capturing unit 21, and displays the augmented reality image on the display unit 22. For example, as shown in the flowchart of FIG. 3, the terminal program 260 causes the computer (controller 27) to execute a process of performing image recognition of the design of at least part of a picture obtained by capturing an image of the character(s) by the image capturing unit 21 (S105 to S107) and a process of generating an augmented reality image by combining a stagecraft image, which is prepared in association with each of image-recognized designs, with a subject image of a person wearing or having the character item 10, and displaying the augmented reality image on the display unit 22 (S108 to S111).

According to the terminal program 260 according to the embodiment, by consecutively reading and executing, by the computer (controller 27), the terminal program 260, the terminal program 260 which is capable of performing image recognition of the design of a picture obtained by capturing an image of a character(s) printed on or attached to the character item 10, generating an augmented reality image by combining a stagecraft image, which is prepared in association with each of designs, with a subject image of a person wearing or having the character item 10, and displaying the augmented reality image can be provided. Therefore, a simple augmented reality image made from a stagecraft image and a subject image can be generated without involving perspective transformation technology. Also, more elaboration and the effects of promoting the character item 10 can be achieved by displaying an augmented reality image associated with the character item 10 purchased by the consumer.

The augmented reality system 100 according to the embodiment includes, for example, as shown in FIG. 1, the character item 10 on which a particular character(s) is(are) printed or attached, and the mobile terminal device 20. The mobile terminal device 20 at least includes the image capturing unit 21 and the display unit 22, and includes the controller 27. The controller 27 performs image recognition of the design of at least part of a picture obtained by capturing an image of the character(s) by the image capturing unit 21, combines a stagecraft image prepared in association with each of image-recognized designs with a subject image of a person wearing or having the character item 10, and displays the combined image on the display unit 22.

According to the augmented reality system 100 according to the embodiment, the augmented reality system 100 can be provided in which the mobile terminal device 20 performs image recognition of the design of a video image obtained by capturing an image of the character(s) printed on or attached to the character item 10, generates an augmented reality image by combining a stagecraft image, which is prepared in association with each of designs, with a subject image of a person wearing or having the character item 10, and displays the augmented reality image. Therefore, an augmented reality image made from a stagecraft image and a subject image can be easily generated without involving perspective transformation technology. As a result, more elaboration and the effects of promoting the character item 10 can be achieved by displaying an augmented reality image associated with the character item 10 purchased by the consumer.

The character item 10 according to the embodiment is, for example, as shown in FIG. 1, 4A, or 4B, the character item 10 on which a particular character(s) is/are printed or attached. The character item 10 is used in the augmented reality system 100 realized by using the mobile terminal device 20 which performs image recognition of the design of at least part of a picture obtained by capturing an image of the character(s), combines a stagecraft image prepared in association with each of designs with a subject image of a person wearing or having the character item 10, and displays the combined image.

According to the character item 10 according to the embodiment, with the character item 10 on which a particular character(s) is/are printed or attached, the mobile terminal device 20 can be caused to perform image recognition of the design of at least part of a picture obtained by capturing an image of the character(s), generate an augmented reality image by combining a stagecraft image, which is prepared in association with each of designs, with a subject image of a person wearing or having the character item 10, and display the augmented reality image. Also, according to the character item 10 according to the embodiment, at least part of the character(s) printed on or attached to the character item 10 includes a design whose image is recognized from an image of the character(s) included in a subject image, captured by the mobile terminal device 20, of a person wearing or having the character item 10. For the design, a corresponding stagecraft image is prepared in the mobile terminal device 20. The stagecraft image is combined by the mobile terminal device 20 with the subject image of the person wearing or having the character item 10, thereby generating an augmented reality image. According to the character item 10 according to the embodiment, needless to say, the effects of promoting the character item 10 can be achieved. In addition, the enjoyment of the character item 10 is doubled, while the fashionable value of the character item 10 is maintained. This may give rise to secondary effects such as naturally promoting conversation between the child who has the character item 10 as a favorite item and the parent who operates the mobile terminal device 20.

Although the character item 10 according to the embodiment is a printed T-shirt by way of example in the above description, the character item 10 is applicable to items that a person wears or uses, such as bags, pins, batches, and all types of clothing and accessories on which a character(s) is/are printed or attached, toys, everyday items, and the like. Although the stagecraft image used in the mobile terminal device 20 is a still image by way of example in the above description, the stagecraft image may be an illustration or a moving image such as a two-dimensional or three-dimensional animated computer graphics (CG) image. Although the stagecraft image is not particularly limited as long as it is an image associated with a character(s), the stagecraft image is preferably an image of a character(s) making a pose. Accordingly, an image obtained by combining the stagecraft image with a subject image of a person wearing or having the character item 10 becomes like a ceremonial photograph, which is more entertaining. The character(s) is/are not limited to a virtual character(s) appearing in a cartoon or animation, and the character(s) may be a real person such as an idol or an actor/actress. Further, although the mobile terminal device 20 is a smartphone by way of example in the above description, the mobile terminal device 20 may be a cellular phone, a personal digital assistant (PDA), or a personal computer (PC) with an image capturing function and Internet connection environment.

Although the preferred embodiment of the invention has been described in detail above, the technical scope of the present invention is not limited to the scope described in the above-described embodiment. It is apparent for those skilled in the art that various changes or improvements can be made to the above-described embodiment. It is also apparent from the claims that the embodiment with such various changes or improvements is also included in the technical scope of the present invention.

What is claimed is:

1. A mobile terminal device, comprising:
an image capturing unit;
a display unit; and
a controller configured to
control the image capturing unit to capture an image of a cartoon or animation character or an image of a human person printed on or attached to an article of clothing,
recognize the character or the human person from the captured image,
retrieve a stagecraft image corresponding to the recognized character or human person,
generate an augmented reality image by combining the stagecraft image with a subject image of a person wearing the article of clothing, and
display the augmented reality image on the display unit.

2. The mobile terminal device according to claim 1, wherein the controller changes a size of the stagecraft image in accordance with a size of the subject image of the person wearing the article of clothing.

3. The mobile terminal device according to claim 1, further comprising an audio output unit,
wherein, when the augmented reality image is displayed on the display unit, the controller generates sound effects and outputs the generated sound effects to the audio output unit.

4. The mobile terminal device according to claim 1, wherein the stagecraft image is an image of the character or the human person making a pose.

5. An augmented reality system, comprising:
an article of clothing having an image of a cartoon or animation character or an image of a human person printed thereon or attached thereto; and
a mobile terminal device that at least includes
an image capturing unit,
a display unit, and
a controller configured to
control the image capturing unit to capture the image of the cartoon or animation character or the image of the human person,
recognize the character or the human person from the captured image,
retrieve a stagecraft image corresponding to the recognized character or human person,
generate an augmented reality image by combining the stagecraft image with a subject image of a person wearing the article of clothing, and
display the augmented reality image on the display unit.

6. A non-transitory medium containing program instructions for a mobile terminal device that has an image capturing unit, a display unit and a computing device, execution of the program instructions by the computing device causing the mobile terminal device to perform the steps of:

capturing, using the image capturing unit, an image of a cartoon or animation character or an image of a human person printed on or attached to an article of clothing;

recognizing the character or the human person from the captured image;

retrieving a stagecraft image corresponding to the recognized character or human person;

generating an augmented reality image by combining the stagecraft image with an image of a person wearing the article of clothing; and displaying the augmented reality image on the display unit.

7. An article of clothing having an image of a cartoon or animation character or an image of a human person printed thereon or attached thereto, the article of clothing comprising:

a tag containing information of an application program, the information being scannable by a mobile terminal device to thereby download the application program, the application program being executable by the mobile terminal device to thereby perform the steps of:

capturing the image of the cartoon or animation character or the image of the human person;

recognizing the character or the human person from the captured image;

retrieving a stagecraft image corresponding to the recognized character or human person; and generating an augmented reality image by combining the stagecraft image with an image of a person wearing the article of clothing.

\* \* \* \* \*